United States Patent
Riley et al.

(10) Patent No.: US 10,803,125 B2
(45) Date of Patent: Oct. 13, 2020

(54) RENDERING LOCATIONS ON MAP BASED ON LOCATION DATA

(71) Applicant: Microsoft Technology Licensing, LLC, Redmond, WA (US)

(72) Inventors: Erin M. Riley, Issaquah, WA (US); Jeff West, Sammamish, WA (US); Silvana P. Moncayo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 15/639,181

(22) Filed: Jun. 30, 2017

(65) Prior Publication Data

US 2019/0005153 A1   Jan. 3, 2019

(51) Int. Cl.
| | |
|---|---|
| *G06F 16/9038* | (2019.01) |
| *G06F 16/40* | (2019.01) |
| *G06Q 10/00* | (2012.01) |
| *G06F 16/435* | (2019.01) |
| *G06F 16/9535* | (2019.01) |
| *G01C 21/36* | (2006.01) |
| *G09B 29/00* | (2006.01) |

(52) U.S. Cl.
CPC ..... *G06F 16/9038* (2019.01); *G01C 21/3679* (2013.01); *G01C 21/3682* (2013.01); *G06F 16/40* (2019.01); *G06F 16/435* (2019.01); *G06F 16/9535* (2019.01); *G06Q 10/00* (2013.01); *G09B 29/007* (2013.01)

(58) Field of Classification Search
CPC .... G06F 16/9038; G06F 16/40; G06F 16/435; G06F 16/9535; G06Q 10/00; G01C 21/3679; G01C 21/3682; G09B 29/007
See application file for complete search history.

(56) References Cited

U.S. PATENT DOCUMENTS

| | | | |
|---|---|---|---|
| 8,526,969 B2 | 9/2013 | Zheng et al. | |
| 8,781,393 B2 * | 7/2014 | Taveau | H04M 1/2745 455/41.1 |
| 8,918,398 B2 | 12/2014 | Petersen et al. | |
| 9,026,516 B1 | 5/2015 | Chapin et al. | |

(Continued)

FOREIGN PATENT DOCUMENTS

WO     2013192583 A1    12/2013

OTHER PUBLICATIONS

"Google Play: Family Locator—GPS Tracker", https://play.google.com/store/apps/details?id=com.life360.android.safetymapd&hl=en, Published on: Feb. 4, 2016, 4 pages.

(Continued)

*Primary Examiner* — Russell Frejd
(74) *Attorney, Agent, or Firm* — Holzer Patel Drennan

(57) ABSTRACT

A map application is provided that allows a user to view and query the location data associated with the contacts of the user. The location data of a contact may include locations of where the contact has been, along with a time when the contact was at each location. The user can use the map application to view the location data of selected users or groups of users. The user can further generate a query, and the map application can determine locations from the location data of the contacts that are related to the generated query. In this way, the user can search for locations such as businesses and landmarks that were visited by their contacts, and can view the locations on a map.

18 Claims, 10 Drawing Sheets

(56) References Cited

U.S. PATENT DOCUMENTS

| | | | |
|---|---|---|---|
| 9,344,852 B2 | 5/2016 | Hawkins et al. | |
| 2002/0023010 A1* | 2/2002 | Rittmaster | G06F 16/9537 |
| | | | 705/26.1 |
| 2002/0023215 A1* | 2/2002 | Wang | G06Q 20/00 |
| | | | 713/171 |
| 2004/0203381 A1* | 10/2004 | Cahn | H04B 5/0012 |
| | | | 455/41.2 |
| 2007/0015518 A1 | 1/2007 | Winter et al. | |
| 2007/0150444 A1* | 6/2007 | Chesnais | H04W 4/02 |
| 2008/0079539 A1 | 4/2008 | Daley et al. | |
| 2009/0005079 A1* | 1/2009 | Shields | G06F 16/29 |
| | | | 455/456.3 |
| 2010/0082247 A1* | 4/2010 | Klein | H04L 63/107 |
| | | | 701/533 |
| 2012/0265433 A1* | 10/2012 | Viola | G01C 21/362 |
| | | | 701/410 |
| 2012/0304087 A1* | 11/2012 | Walkin | H04L 12/1813 |
| | | | 715/764 |
| 2013/0073968 A1* | 3/2013 | Appelman | H04L 51/04 |
| | | | 715/736 |
| 2013/0176321 A1 | 7/2013 | Mitchell et al. | |
| 2013/0263025 A1* | 10/2013 | Maddocks | G06F 16/9537 |
| | | | 715/760 |
| 2015/0220538 A1 | 8/2015 | Seefeld et al. | |
| 2016/0102991 A1 | 4/2016 | Ettinger | |
| 2016/0182661 A1* | 6/2016 | Brezina | H04M 15/00 |
| | | | 709/206 |
| 2017/0091332 A1 | 3/2017 | Haiby-Weiss et al. | |

OTHER PUBLICATIONS

Basu, Saikat, "MUO: 5 Ways to See Your Facebook Friends on a World Map", http://www.makeuseof.com/tag/5-ways-facebook-friends-world-map/, Published on: Apr. 6, 2011, 5 pages.

"International Search Report and Written Opinion Issued in PCT Application No. PCT/US2018/039643", dated Aug. 30, 2018, 11 Pages.

* cited by examiner

RENDERING LOCATIONS ON MAP BASED ON LOCATION DATA

BACKGROUND

Map applications are a popular type of application, with a variety of uses. For example, a user may use a map application to determine directions, or may use the map application to determine restaurants, banks, drug stores, and other businesses near a current location. Map applications are commonly integrated into smart phones, tablets, and vehicle navigation systems, and may be accessed by any computing device though the Internet.

One popular feature of map applications is that users can view the locations of their contacts on the map. This may allow a user to see which of their contacts are nearby, and may allow the user to meet up with a nearby contact. For example, a user may use the map application to determine that one of their friends is in the same city as they, and may use the map application to contact the friend.

While such a feature is useful, it is limited to the current locations of the user and the user's contacts. There is currently no way to use a map application to view the locations where a user's contacts have been in the past. Such information may useful in selecting restaurants or other businesses when the user is visiting new cities or neighborhoods, for example.

SUMMARY

A map application is provided that allows a user to view and query the location data associated with the contacts of the user. The location data of a contact may include locations of where the contact has been, along with a time when the contact was at each location. The user can use the map application to view the location data of selected users or groups of users. The user can generate a query, and the map application can determine locations from the location data of the contacts that are related to the generated query. In this way, the user can search for locations such as businesses and landmarks that were visited by their contacts, and can view the locations on a map.

In an implementation, a system for using historical location data for contacts associated with a user to determine locations that are responsive to user queries is provided. The system includes at least one computing device and a map engine. The map engine may be adapted to: receive contacts for a user from one or more applications; receive location data for each of the contacts, wherein the location data for each contact comprises a plurality of locations, and each location of the plurality of locations is associated with a time when the contact was at the associated location; receive a query from the user; and determine one or more locations that are responsive to the query based on the received contacts and the received location data for each of the received contacts.

In an implementation, a system for using historical location data for contacts associated with a user to determine locations that are relevant to a location associated with the user is provided. The system may include at least one computing device and a map engine. The map engine may be adapted to: render a map; receive contacts for a user from one or more applications; receive location data for each of the contacts, wherein the location data for each contact comprises a plurality of locations, and each location of the plurality of locations is associated with a time when the contact was at the associated location; receive a location associated with the user; receive a selection of a contact of the received contacts; based on the received location, determine locations of the plurality of locations of the selected contact that are within a threshold distance of the location associated with the user; and render information associated with one or more of the determined locations on the map.

In an implementation, a method for using historical location data for contacts associated with a user to determine locations that are responsive to user queries is provided. The method includes: rendering a map on a display by a computing device; receiving contacts for a user by the computing device; receiving location data for each of the contacts by the computing device, wherein the location data for each contact comprises a plurality of locations, and each location of the plurality of locations is associated with a time when the contact was at the associated location with the user; receiving a query from the user by the computing device; determining one or more locations that are responsive to the query based on the received contacts and the received location data for each of the received contacts by the computing device; and rendering information associated with the determined one or more locations on the map by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
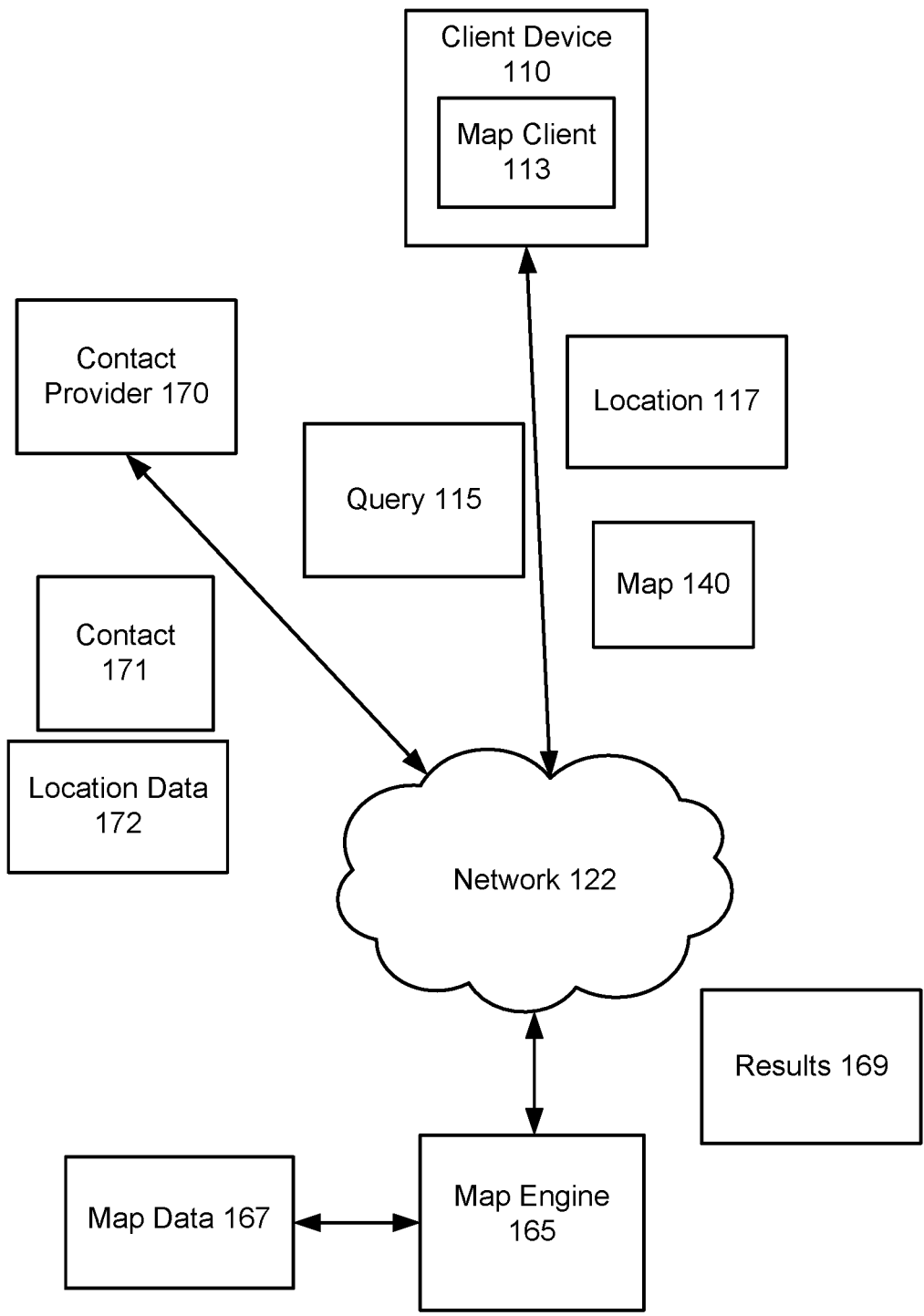
FIG. 1 is an illustration of an exemplary environment for using location data in a map application.

FIG. 1 is an illustration of an exemplary environment 100 for using location data in a map application. The environment 100 may include a map engine 165, one or more contact providers 170, and one or more client devices 110 in communication through a network 122. The network 122 may be a variety of network types including the public switched telephone network (PSTN), a cellular telephone network, and a packet switched network (e.g., the Internet). Although only one client device 110, one contact provider 170, and one map engine 165 are shown in FIG. 1, there is no limit to the number of client devices 110, contact providers 170, and map engines 165 that may be supported.

Figure 10:
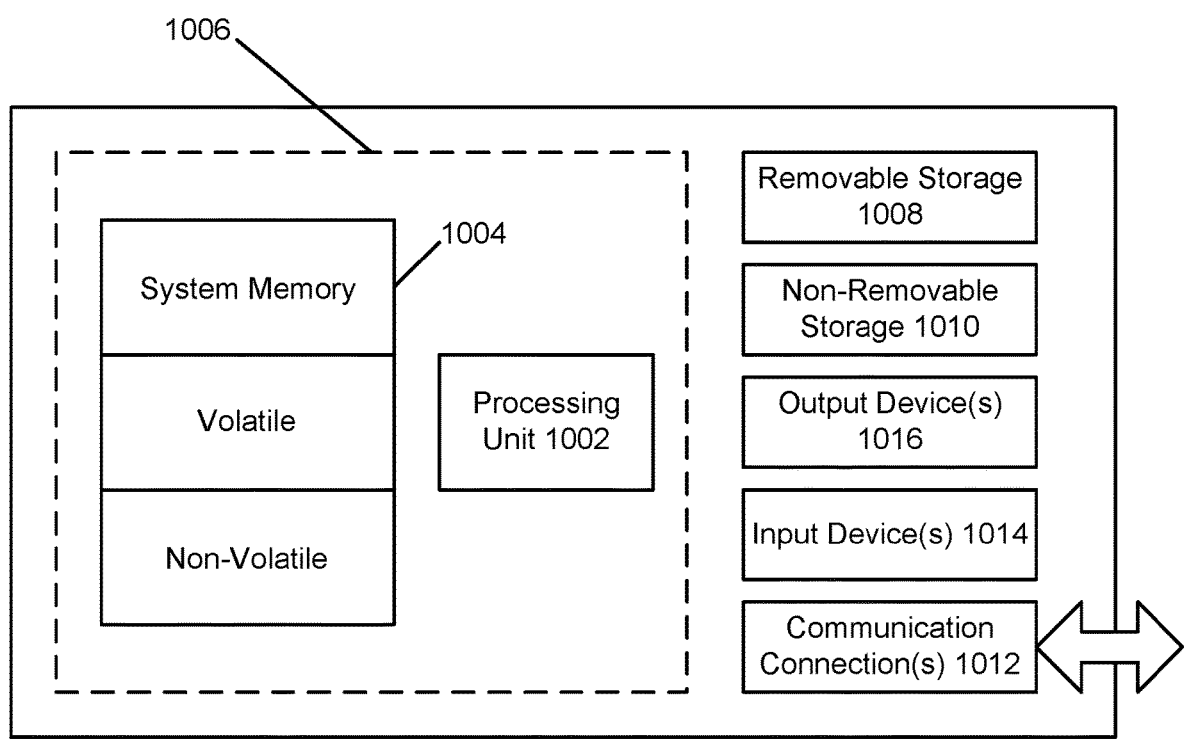
FIG. 10 shows an exemplary computing environment in which example embodiments and aspects may be implemented.

The client device 110 and the map engine 165 may be implemented using a variety of computing devices such as smart phones, desktop computers, laptop computers, tablets, vehicle navigation systems, and video game consoles. Other types of computing devices may be supported. A suitable computing device is illustrated in FIG. 10 as the computing device 1000.

Each client device 110 may further include a map client 113. The map client 113 may be used by a user of the client device 110 to view and interact with one or more maps 140. Depending on the implementation, the map client 113 may be, or may be part of, a map application. An example map application is the map application integrated into most smart phones, tablet computers, and vehicle navigation systems.

Each contact provider 170 may provide one or more contacts 171 to a user of the client device 110. A contact 171 may represent a person or entity that is associated with user in an application. Examples of contacts 171 may be "friends" in a social networking application, and entries or records in an e-mail application or a phone application. Information included in a contact 171 may include name, age, date of birth, work information, address, or any other information that may be included in a profile.

A user may use the map client 113 to view one or more locations 117 on the map 140. The locations 117 may include a current location 117 of a user, or may include a location 117 selected by the user. For example, a user may enter a location 117 (such as an address or geographic coordinates) into the map client 113, and the map client 113 may render a map 140 centered about the entered location 117. Alternatively, the location 117 may be a current location of the user as determined by a location determination component of the client device 110.

The user may use one or more navigation tools provided by the map client 113 to interact with the map 140 by changing settings such a zoom level, a rotation of the map 140, or by moving the map 140. The map client 113 may display or render features of the map 140 that are visible to the user based on the location 117 and the settings associated with the map 140. In some implementations, the map client 113 may render the current locations 117 associated with contacts 171 of the user.

The user may use the map client 113 to generate one or more queries 115. A query 115 may be a request for the location 117 of entities such as individuals, businesses, restaurants, etc. that match one or more terms of the query 115. For example, a user may generate a query 115 "Pizza" for the locations 117 of restaurants or businesses that are associated with the term "Pizza." In another example, a user may generate a query 115 for a route between an origin location and a destination location.

The map client 113 may provide the generated queries 115 to the map engine 165, and the map engine 165 may fulfill the queries 115 using map data 167. The map data 167 may include the various features of the map 140 such as roads, buildings, bodies of water, parks, landmarks, etc. The map data 167 may include locations 117 and other information about entities such as individuals, hotels, restaurants, bars, stores, universities, hospitals, etc. The map data 167 may include information such as traffic data (real-time and historical). The map data 167 may include information about public transportation, trains, ferries, bike trails, and other modes of transportation. Other information may be included in the map data 167.

The map engine 165 may use the map data 167 to generate results 169 in response to queries 115. Depending on the implementation, the results 169 for a query 115 may include identifiers of one or more entities that are response to the query 115 along with locations 117 associated with the entities. Continuing the example above, for the query 115 "Pizza" the results 169 may identify entities such as restaurants that sell pizza and may include the location 117 of each restaurant on the map 140.

One drawback associated with current map applications is that they limit the user to view the current (or most recent) location 117 for each contact 171. For example, a user can see where their friends are on the map 140, but the user cannot see where their friends have been on the map 140 in the past.

Accordingly, to facilitate the use of past locations 117 in the map client 113, the map engine 165 may further receive location data 172 for each contact 171 from the contact providers 170. The location data 172 for a contact 171 may include a plurality of locations 117, and each location 117 may be associated with a time (including date) of when the contact 171 was at each location 117.

As described further herein, the location data 172 may allow for the map engine 165 to provide a variety of features to the map clients 113. One such feature is the ability of a user to view the location data 172 associated with one or more of their contacts 171 on the map 140, and for the user to generate queries 115 on the location data 172.

For example, a user may be viewing a map 140 for an unfamiliar city. The user may be interested in locations 117 in the unfamiliar city such as restaurants, parks, and neighborhoods that are frequented by one or more of their contacts 171. Accordingly, the user may generate a query 115 that requests locations 117 in the unfamiliar city that are frequented by one or more of their contacts 171.

The map engine 165 may use the location data 172 associated with the contacts 171 to determine locations 117 that are within some threshold distance of a current location 117 of the user in the unfamiliar city, and may provide results 169 that include some or all of the determined locations 117. The map client 113 may render the locations 117 from the results 169 on the map 140 along with information such as which contact 171 each location 117 is associated with, and when one or more of the contacts 171 were at each location 117.

Another feature provided by the map engine 165 is the ability of a user to view locations 117 that the user and their contacts 171 visited at the same time, and to allow for the user to generate queries 115 on those locations 117. For example, a user may be interested in visiting a particular park that she visited with her mother at a particular date. The user may use the map client 113 to generate a query 115 requesting locations 117 that both she and her mother were at on the particular date. The map engine 165 may use the location data 172 associated with the mother and the location data 172 associated with the user to determine any locations 117 in common between the mother and the user at the particular date, and may provide results 169 that include some or all of the determined locations 117. The map client 113 may render the locations 117 from the results 169 on the map 140 along with information about each location.

Figure 2:
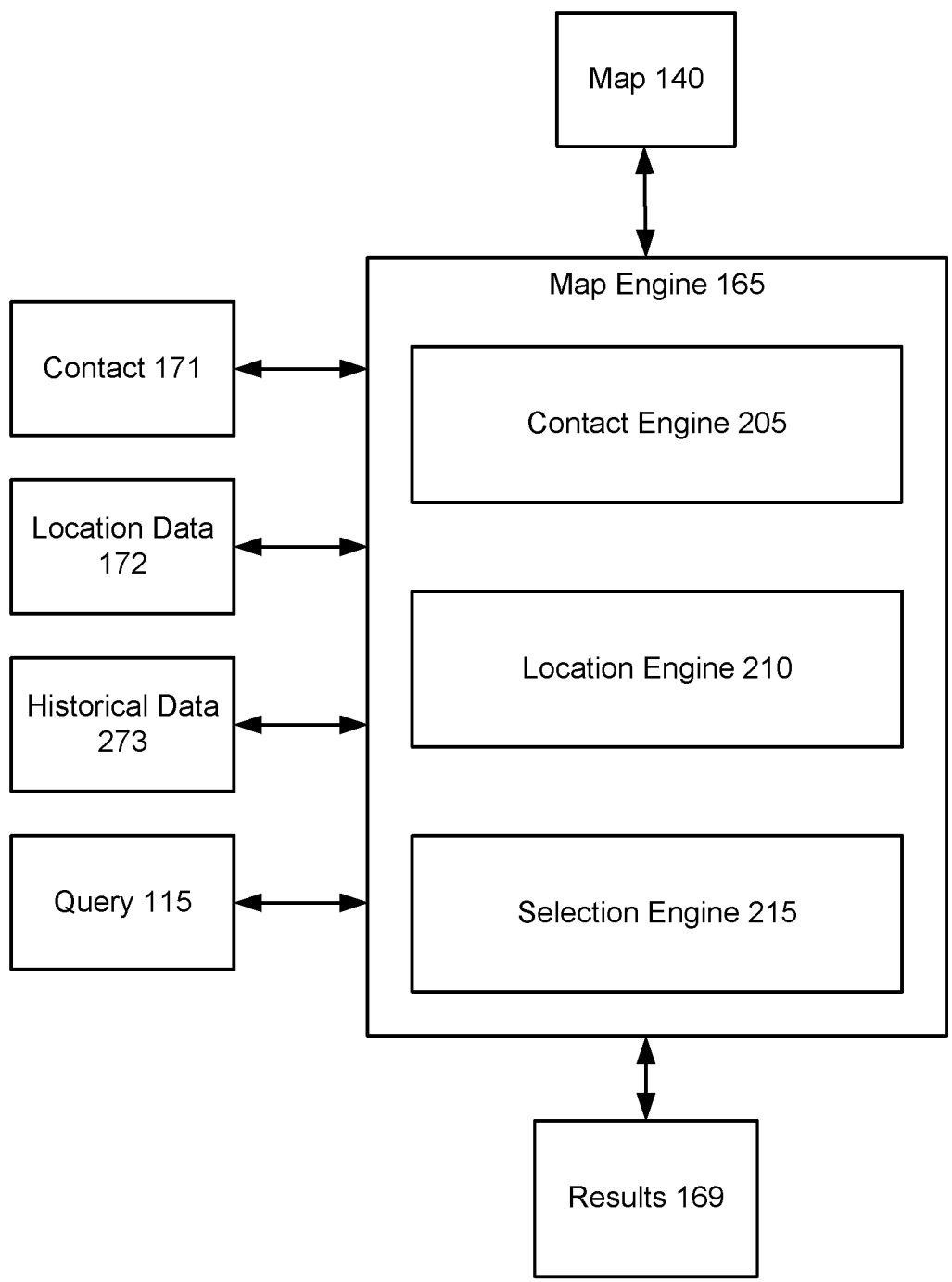
FIG. 2 is an illustration of an implementation of an exemplary map engine.

FIG. 2 is an illustration of an implementation of an exemplary map engine 165. The map engine 165 may include one or more components including a contact engine 205, a location engine 210, and a selection engine 215. More or fewer components may be included in the map engine 165. Some or all of the components of the map engine 165 may be implemented by one or more computing devices such as the computing device 1000 described with respect to FIG. 10. In addition, some or all of the functionality attributed to the map engine 165 may be performed by the map client 113, and vice versa.

The contact engine 205 may collect and/or determine contacts 171 for each user of the map engine 165. Depending in the implementation, the contact engine 205 may determine contacts for a user by retrieving the contacts 171 from one or more contact providers 170. The contact providers 170 may include applications associated with the users, such as social networking applications.

For example, the contact engine 205 may receive credentials and/or permissions from a user for one or more social networking applications that the user is associated with, and the contact engine 205 may retrieve the contacts 171 from the one or more social networking applications using the credentials. Other types of applications may be used to retrieve contacts 171 including email applications, messaging applications, etc.

The contact engine 205 may associate each determined contact 171 with the user. In addition, the contact engine 205 may include profile information with each contact 171. The profile information may be taken from a profile associated with each contact 171 in the social networking applications and may include information such as name, occupation, interests, etc. Other types of information may be included.

The contact engine 205 may collect and determine historical data 273 about some or all of the contacts 171. The historical data 273 collected for a contact 171 may include information about the contact 171 such as where the contact 171 grew up, where the contact 171 was born, where the contact 171 went to high school or college, etc. Depending on the implementation, the historical data 273 may be collected from the social networking application profiles associated with the contacts 171, or public records associated with the contacts 171. Alternatively or additionally, the historical data 273 may be provided by the contact 171.

In some implementations, the historical data 273 for a contact 171 may include data regarding one or more ancestors of the contact 171 (e.g., family tree) such as parents, grandparents, great-grandparents, etc. The information about each ancestor may include nationality, date of birth, date of death, place of birth, place of death, etc. The information regarding each contact 171 may be determined by the contact engine 205 from public records, or using one or more genealogy focused applications or websites.

As may be appreciated, the data including profile information and historical data 273 collected about each contact 171 may be personal and private. Accordingly, to protect the privacy of each contact 171, all of the information collected about each contact 171 may be encrypted. Moreover, before any information is collected and used by the contact engine 205, each contact 171 may be asked to opt-in or otherwise consent to the collection and use of such information.

The location engine 210 may generate location data 172 for each contact 171. As described above, the location data 172 for a contact 171 may include a plurality of locations 117, and each location 117 may be associated with a time when the contact 171 was at the associated location 117. Depending on the implementation, each contact 171 may be associated with a client device 110 that includes a location determination component (e.g., a GPS) that periodically determines the location 117 of the client device 110, and may provide the determined location 117 to the location engine 210. The location engine 210 may associate the location 117 with a time, and may add the location 117 and associated time to the location data 172 associated with the user. Similar to the historical data 273, each contact 171 may consent or opt-in to the collection and storage of location data 172.

Alternatively or additionally, an application, such as a social networking application, health application, or map application, executing on a client device 110 associated with a contact 171 may generate its own location data 172. The generated location data 172 may be periodically provided to the location engine 210.

The frequency at which the location data 172 is updated may be set by a user or an administrator. In some implementations, the location data 172 may be updated at a regular interval. For example, the location engine 210 may determine the location 117 of each contact 171 every second, minute, hour, etc., and may use the determined location 117 to update the location data 172.

In other implementations, the location data 172 may be updated in response to some event such as the associated contact 171 traveling more than a threshold distance, the associated contact 171 traveling to a known location 117 or feature, or the associated contact 171 providing some affirmative action such as "checking-in" or posting to a social networking application. For example, the client device 110 may update the location 117 of the client device 110 when the client device 110 travels more than fifty feet from a previous location 117, when the client device 110 arrives at a known restaurant or business, or when the contact 171 posts content to a social networking application.

The selection engine 215 may select one or more locations 117 to display or render on a map 140 for a user of a map client 113. Depending on the implementation, the selection engine 215 may select locations 117 based on the current location 117 of the client device 110 associated with the user and the locations 117 from the location data 172 of one or more contacts 171 associated with the user. The selection engine 215 may provide the selected one or more locations 117 to the map client 113 as the results 169. The map client 113 may render or display information associated with the contacts 171 corresponding to the selected one or more locations 117 from the results 169 on the map 140.

For example, a user may be viewing a map 140 on their map client 113 while located in a neighborhood of New York. The selection engine 215 may determine location data 172 associated with one or more contacts 171 of the user that includes locations 117 that are in the same neighborhood. The map client 113 may render some or all of the determined locations 117 on the map 140 along with information such as the name of the contact 171 associated with the location 117, when the contact 171 was at the location 117, how many times the contact 171 was at the location, and whether the user and the contact 171 were ever at the location 117 at the same time. Other information may be displayed.

Depending on the implementation, where too many matching locations 117 are determined to render at the same time, the selection engine 215 may limit the locations 117 to location data 172 associated with particular contacts 171. For example, the selection engine 215 may limit the considered contacts 171 to those that the user has recently interacted with, or that have multiple interactions with the user. The interactions may include messages such as e-mails, phone calls, text messages, etc. In addition, the selection engine 215 may further limit the locations to recent locations 117. For example, the selection engine 215 may favor locations 117 with associated times from the last week, month, year, etc.

The selection engine 215 may also select and render locations 117 based on one or more queries 115. In some implementations, a query 115 may identify one or more contacts 171, and the selection engine 215 may select and render locations 117 based on the current location of the user (or client device 110) and the one or more contacts 171 identified by the query 115. The query 115 may identify a single contact 117 (e.g., "bill" or "Jane"), or may identify multiple contacts or groups of contacts 171 (e.g., "Bill and Jane", "Work Friends", "College Friends", "Family", etc.).

For example, a user may be visiting an office of their employer in another city and may wish to learn about locations 117 in the city that were visited by their contacts 171 from work. Accordingly, while viewing a map 140 of the city, the user may use their map client 113 to generate a query 115 that identifies some or all of their contacts 171 that are associated with their employer, and may submit the query 115 to the map engine 165. The selection engine 210 may retrieve the location data 172 of the work contacts 171 identified in the query 115, and may determine locations 117 from the location data 172 that are located in the same city as the user. The determined locations 117 may be provided to the map client 113 as the results 169, and the determined locations 117 may be rendered or displayed on the map 140 in response to the query 115 along with information about the determined locations 117 and the contacts 171 associated with the determined locations 117.

The queries 115 may include one or more keywords describing the locations 117 that the user is interested in. Where the query 115 includes a keyword, the selection engine 215 may identify location data 172 with locations 117 that are responsive to the keyword of the query 115. A location 117 may be responsive to a query 115 if the name of the location 117, or other metadata associated with the location 117, matches or is a partial match of the one or more keywords. The responsive locations 117 may be rendered on the map 140 along with information about the locations 117 and the contacts 171 associated with the locations 117.

For example, a user visiting a new city may wish to learn about locations 117 that sell "Hamburgers". Accordingly, while viewing a map 140 of the city, the user may use their map application to generate a query 115 that includes the keyword "Hamburgers", and may submit the query 115 to the map engine 165. The selection engine 215 may retrieve the location data 172 of the contacts 171 associated with the user, and may determine locations 117 from the location data 172 that match the keyword "Hamburgers".

The queries 115 may further include a date, or a date range. Where the query 115 includes a date, the selection engine 215 may identify location data 172 with locations 117 that are associated with dates or times that fall on the date associated with the date identified by the query 115. Similarly, when the query 115 identifies a date range, the selection engine 215 may identify location data 172 with locations 117 that are associated with dates or times that fall within the date range provided by the query 115. The responsive locations 117 may be rendered on the map 140 along with information about the locations 117 and the contacts 171 associated with the locations 117.

For example, a user may not remember the names of the locations 117 that they visited on their birthday last year. Accordingly, while viewing a map 140, the user may use their map application to generate a query 115 that includes the date associated with their birthday and may submit the query 115 to the map engine 165. The selection engine 215 may retrieve the location data 172 of the contacts 171 associated with the user, and may determine locations 117 from the location data 172 that have times that match the date associated with the birthday. Some or all of the determined locations 117 may be rendered or displayed on the map 140 in response to the query 115.

The queries 115 may further include one or more types. Depending on the implementation, some locations 117 may be associated with a type that describes the type of business or entity that is associated with the location 117. Example types may include "Restaurant", "Gas Station", "Book Store", "Museum", "Coffee Shop", etc. Depending on the implementation, the user may select a type for a query 115 from a drop down selection box, or other user interface element.

As may be appreciated, each query 115 may include some combination of contacts 171, keywords, dates, and types. Thus, for example, a user may generate a query 115 having the date "Apr. 1, 2016", the contact 171 "Mom", and the type "Restaurant".

The selection engine 215 may allow a user to view historical data 273 for one or more of their contacts 171 on the map 140. As described above, the historical data 273 for a contact 171 may include data regarding one or more ancestors of the contact 171 such as parents, grandparents, great-grandparents, etc. In some implementations, a user may select one or more contacts 171 using a map application, and may select a user interface element associated with historical data 273. In response, the selection engine 215 may determine locations 117 from the historical data 273 for the selected one or more contacts 171

For example, a user may use their map application to view historical data 273 associated with a contact 171 named "April". In response, the selection engine 215 may retrieve the historical data 273 associated with the contact 171 named April and may determine one or more locations 117 from the historical data 273. The locations 117 may include where one or more ancestors of April were born or died, where April was born, what high school or college April attended, etc. Some or all of the determined locations 117 may be rendered on a map 140. If the user was already viewing the map 140 prior to selecting to view the historical data 273, locations 117 from the historical data 273 that are within some threshold distance of the current location 117 of the user may be rendered on the map 140. The threshold may be based on the scale or zoom level currently used to view the map 140.

In some implementations, the selection engine 215 may periodically render locations 117 from the historical data 273 associated with the user, or with the user's contacts 171, based on the current location 117 of the user. For example, if the selection engine 215 determines that the user is within a threshold distance of a location 117 associated with the hospital where the user's great grandfather was born, the selection engine 215 may render the location 117 on the map 140 along with information associated with the location 117 from the historical data 273.

Figure 3:
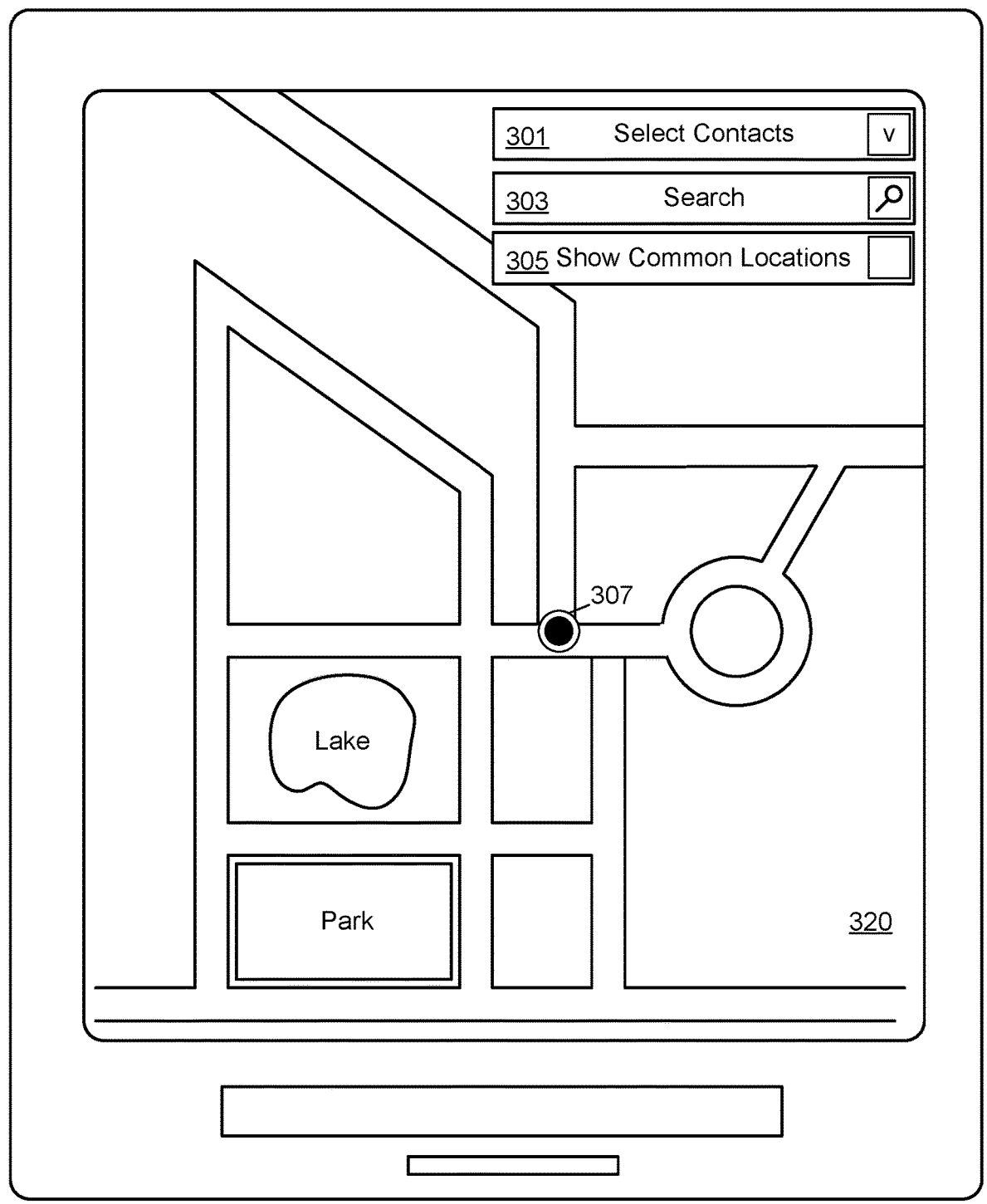
FIGS. 3-6 are illustrations of an example user interface for viewing a map and interacting with one or more locations from location data and/or historical data.

FIG. 3 is an illustration of an example user interface 300 for viewing a map 140 and interacting with one or more locations 117. The user interface 300 may be implemented by a map client 113 executing on a client device 110. As shown, the user interface 300 is displayed on a tablet computing device. However, the user interface 300 may also be displayed by other computing devices such as smart phones and vehicle navigation systems.

As shown in a window 320, a user is viewing a map 140. Shown on the map 140 are various map features including various roads, a lake, and a park. The current location 117 of the user is rendered on the map 140 using an icon 307.

The user interface 300 includes user interface elements 301, 303, and 305. The user interface element 301 labeled with the text "Select Contacts" is a selection box that allows the user to select one or more contacts 171. The user may view or interact with location data 172 associated with the selected one or more contacts 171 on the map 140. If the user selects a contact 171 using the user interface element 301, the selection engine 215 of the map engine 165 may render locations 117 from the location data 172 associated with the selected contact 171 on the map 140 in the window 320.

The user interface element 303 labeled with the text "Search" is a search box that allows the user to enter text for a query 115. Locations 117 that are responsive to the query 115 may be rendered on the map 140 in the window 320. Where a contact 171 is also specified in the user interface element 301, locations 117 that are responsive to the query 115 and that are associated with the specified contact 171 may be rendered on the map 140 in the window 320.

The user interface element 305 labeled with the text "Show Common Locations" is a text box where the user can choose to restrict the rendered or displayed locations 117 to those that the associated contact 171 and the user were together at approximately the same time. For example, if the user and a contact 171 were at a location 117 such as a coffee shop together, then the location 117 would be a common location 117 for the user and the contact 171. If the user was at the location 117 a week earlier than the contact 171, then the location 117 would not be a common location 117 for the user and the contact 171.

Figure 4:
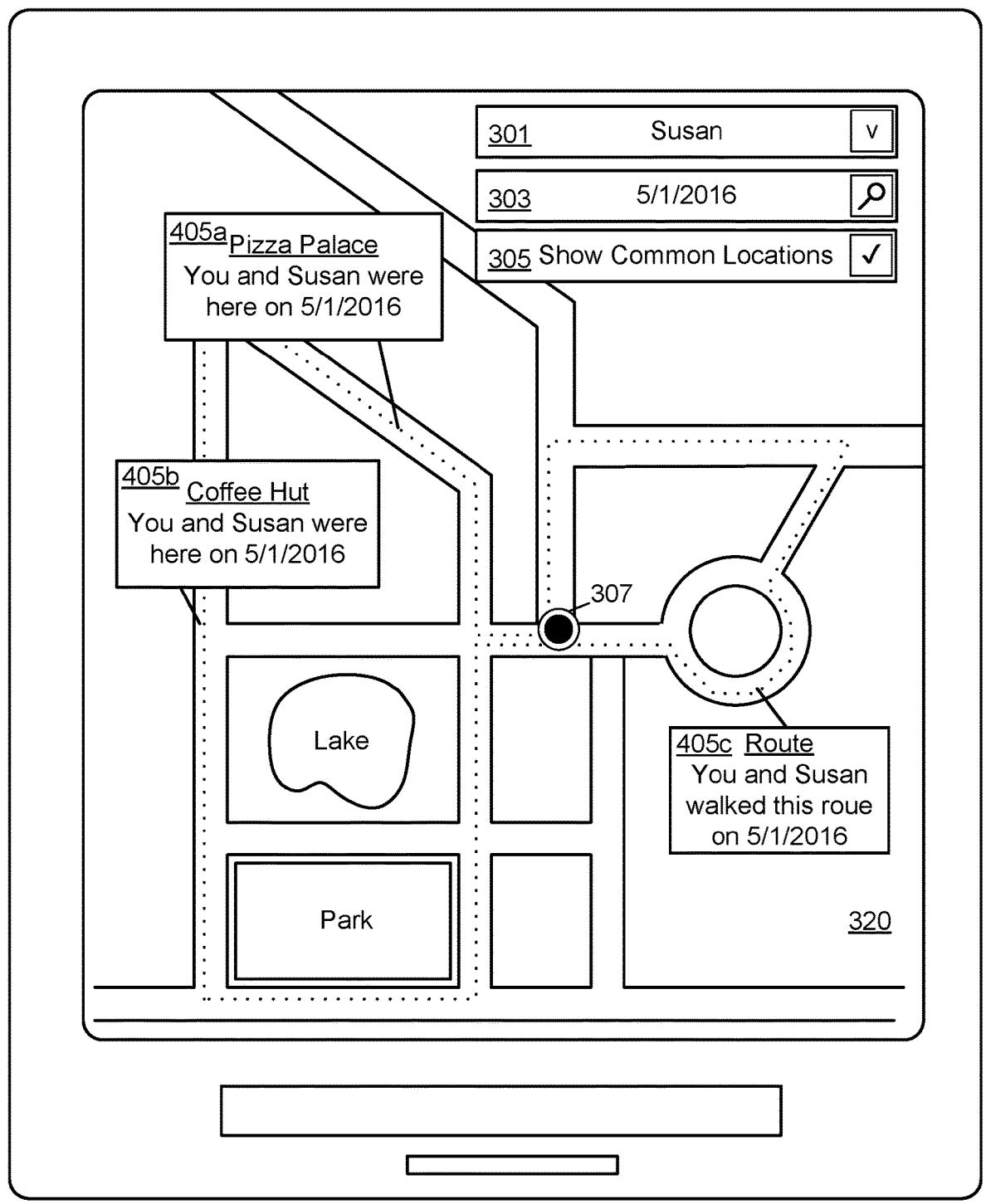

An application of the map engine 165 may allow users to "relive" or retrieve information about past activities with their friends and relatives. Continuing to FIG. 4, the user may have had a good experience with their friend Susan on May 1, 2016, and would like to view the locations 117 that they visited together. Accordingly, the user has selected the contact 171 labeled "Susan" in the user interface element 301, indicating that the user would like to view locations associated with a contact 171 of the user named Susan. The user has entered the query 115 of the date "May 1, 2016" into the user interface element 303, indicating that the user would like to view locations 117 that are part of the location data 172 associated with Susan and that have an associated time or date that occurred on May 1, 2016. In addition, the user has checked the user interface element 305 indicating that the user would like to view locations 117 that the user and Susan were together on May 1, 2016.

In response, the selection engine 215 has retrieved the location data 172 associated with the user and the location data 172 associated with Susan, and has determined locations 117 where the user and Susan were together on May 1, 2016. Depending on the implementation, the determined locations 117 may be locations 117 that are within a threshold distance of the location 117 of the user as shown by the icon 307. The threshold may be based on a scale used to view the map 140 to ensure that the determined locations 117 may be locations 117 that are visible on the map 140.

The selection engine 215 has provided the determined locations 117, and information about each location 117, to the map client 113 to render in the window 320. In the example shown, the selection engine 215 has returned three locations 117 which are rendered on the map 140 in the window 320 as the icons 405 (e.g., the icons 405a, 405b, and 405c). As shown, each location 117 is rendered along with descriptive information about the location 117. Depending on the implementation, the information may only be shown when the user selects the corresponding icon 405, or "hovers" over the corresponding icon 405.

The icon 405a corresponds to a location 117 associated with a restaurant called "Pizza Palace". The icon 405b corresponds to a location 117 associated with a coffee shop called "Coffee Hut". The icon 405c corresponds to a route or a series of locations 117 that were traveled by the user and Susan on May 1, 2016. The route is further rendered on the map 140 as a dotted line.

Figure 5:
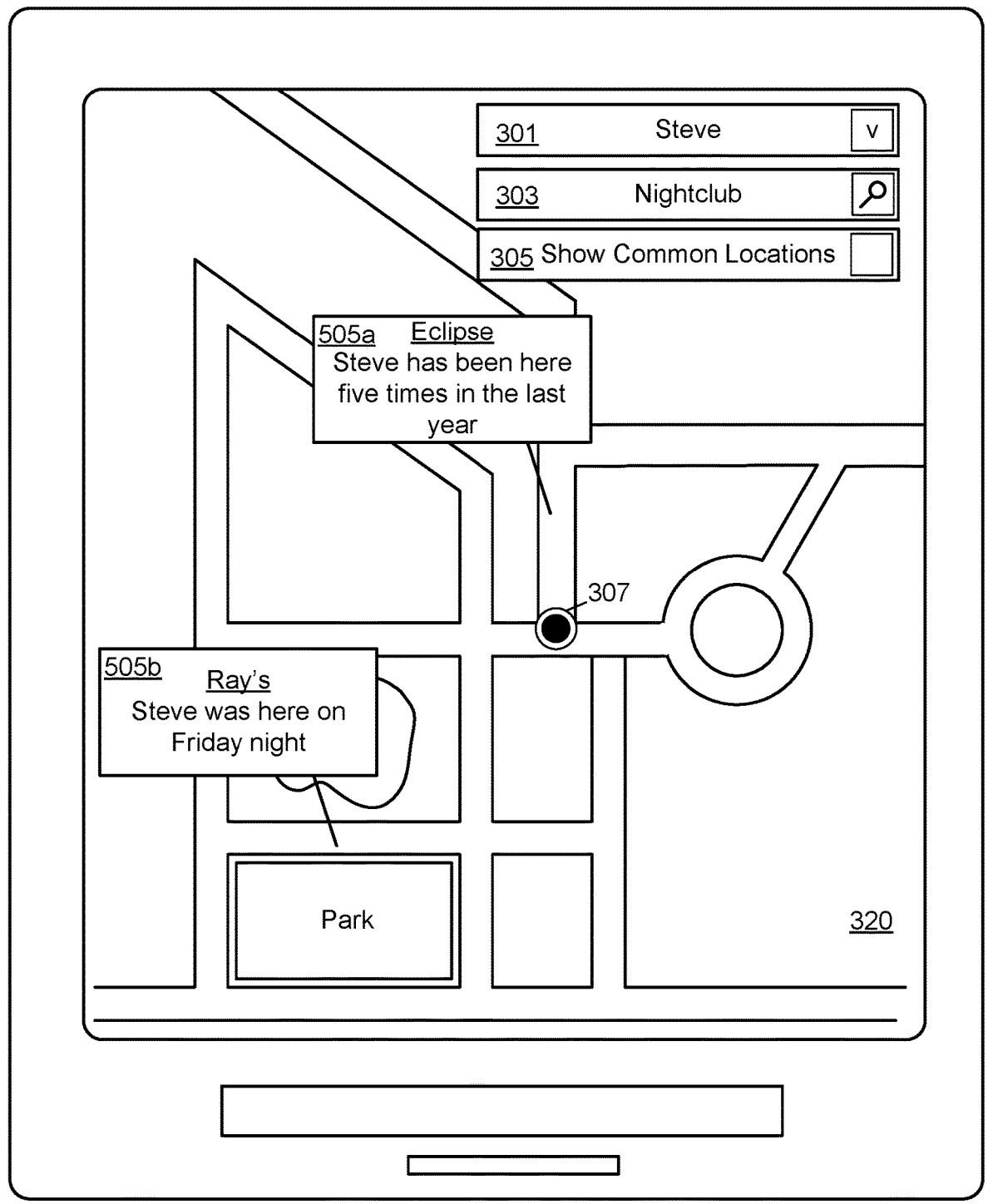

Another application of the map engine 165 may allow users to get "recommendations" for particular types of locations 117 by viewing the locations 117 that are popular with their friends or contacts 171. Continuing to FIG. 5, the user may be in an unfamiliar city and may be interested in what nightclubs are popular with their friend Steve who lives in the unfamiliar city.

Accordingly, the user has selected the contact 171 "Steve" in the user interface element 301, indicating that the user would like to view locations 117 from the location data 172 associated with Steve. The user has entered the query 115 of the type "Nightclub" into the user interface element 303, indicating that the user would like to view locations 117 that are of the type Nightclub. In addition, the user has not checked the user interface element 305 indicating that the user is not limiting the locations 117 to those locations 117 where the user and Steve were located at the same time.

In response, the selection engine 215 has retrieved the location data 172 associated with Steve, and has determined locations 117 that are associated with the type Nightclub. Similar to the example from FIG. 4, the determined locations 117 may be locations 117 that are within a threshold distance of the location 117 of the user as shown by the icon 307.

The selection engine 215 has provided the determined locations 117, and information about each location 117, to the map client 113 to render in the window 320. In the example shown, the selection engine 215 has returned two locations 117 which are rendered on the map 140 in the window 320 as the icons 505 (e.g., the icons 505a and 505b). Each location 117 is rendered along with descriptive information about the location 117.

In the example shown, the information associated with each location 117 conveys the number of times that the contact 171 was at the location 117 and/or the last time the user was at the location 117. For example, the icon 505a for the location 117 named "Eclipse" indicates that "Steve has been here five times in the last year" and the icon 505b for the location 117 "Ray's" indicates that "Steve was here on Friday night."

Figure 6:
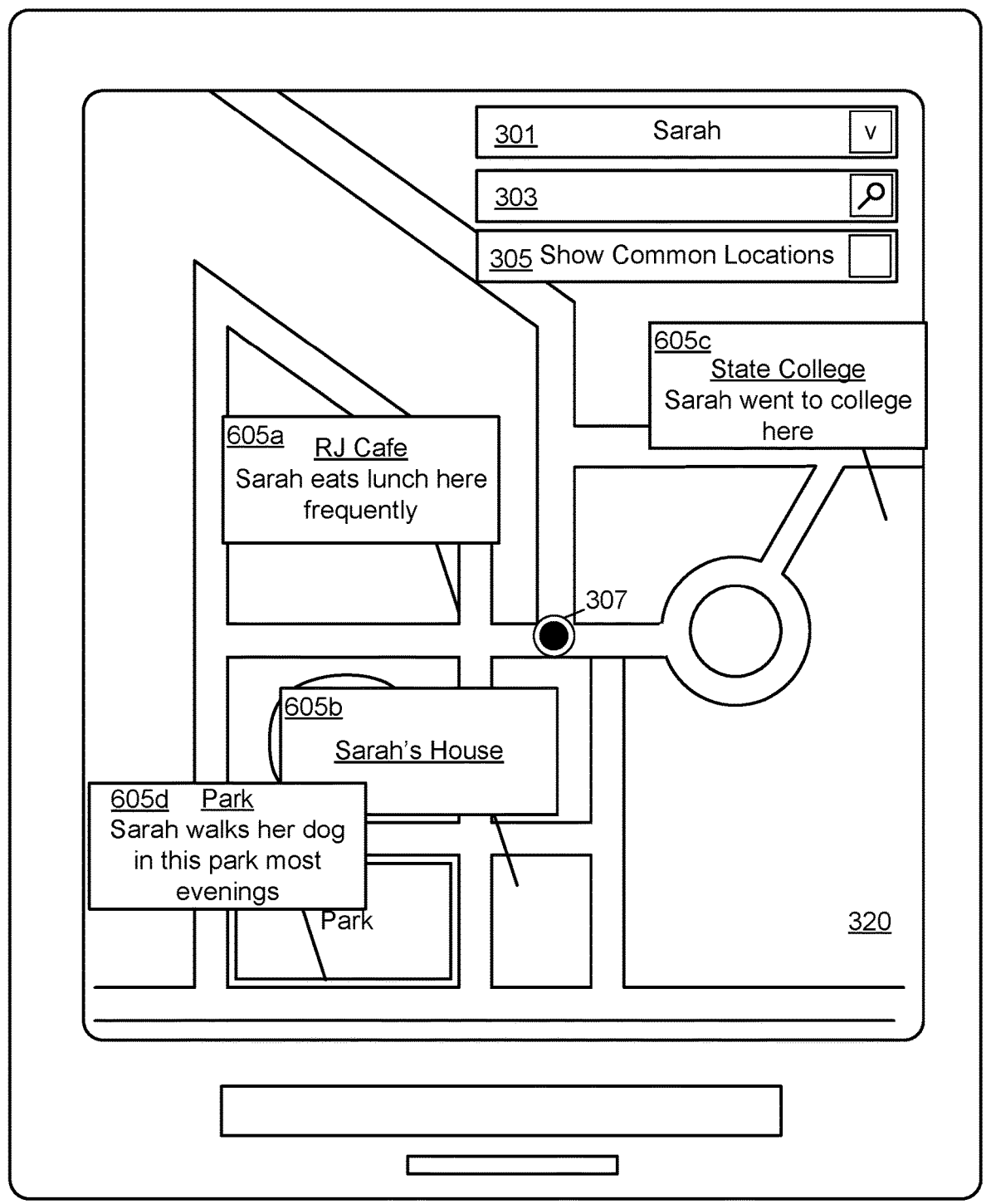

Another application of the map engine 165 may allow users to view locations that have historical or personal significance to their friends from the location data 172 and/or the historical data 273. Continuing to FIG. 6, the user has selected the contact 171 "Sarah" in the user interface element 301, indicating that the user would like to view locations 117 associated with Sarah. The user has not entered any information into the user interface element 303 indicating that the user is not interested in any particular type of location 117. The user has also not checked the user interface element 305 indicating that the user is not limiting the locations 117 to those where the user and Sarah were located at the same time.

In response, the selection engine 215 has retrieved the location data 172 and historical data 273 associated with the contact 171 Sarah, and has determined locations 117 from the location data 172 and historical data 273 to render on the map 140. Similar to the examples from FIGS. 4 and 5, the determined locations 117 may be locations 117 that are within a threshold distance of the location 117 of the user as shown by the icon 307.

The selection engine 215 has provided the determined locations 117, and information about each location 117, to the map client 113 to render in the window 320. In the example shown, the selection engine 215 has returned four locations 117 which are rendered on the map 140 in the window 320 as the icons 605 (e.g., the icons 605a, 605b, 605c, and 605d). Each location 117 is rendered along with descriptive information about the location 117.

In the example shown, the information associated with each location 117 describes how the location 117 is relevant or important to the contact 171. For example, the icon 605a for the location 117 named "RJ Cafe" indicates that "Sarah eats lunch here frequently", the icon 605b indicates that it is the location 117 of "Sarah's House", the icon 605c for the location named "State College" indicates that "Sarah went to college here", and the icon 605d for the location 117 named "Park" indicates that "Sarah walks her dog in this park most evenings."

Depending on the implementation, the particular locations 117 that are selected to be rendered by the selection engine 215 may be the locations 117 that most frequently appear in the location data 172, or may be the locations 117 that are most likely to be of interest to the user associated with the map client 113. For example, there may be a profile that describes the types of locations 117 that the user is interested in, and the selection engine 215 may use the profile to select which locations from the location data 172 are rendered and displayed.

With respect to the historical data 273, the selection engine 215 may select locations 117 that are the closest to the current location 117 of the user, or may select locations 117 based on the user profile as described above. Alternatively, the contact 171 associated with the historical data 273 may specify what locations 117 are shared with the user. For example, a contact 171 may specify that users can view locations 117 corresponding to where the contact 171 went to college, but not the location 117 where the contact 171 works, or any locations 117 associated with the ancestors of the contact 171.

Figure 7:
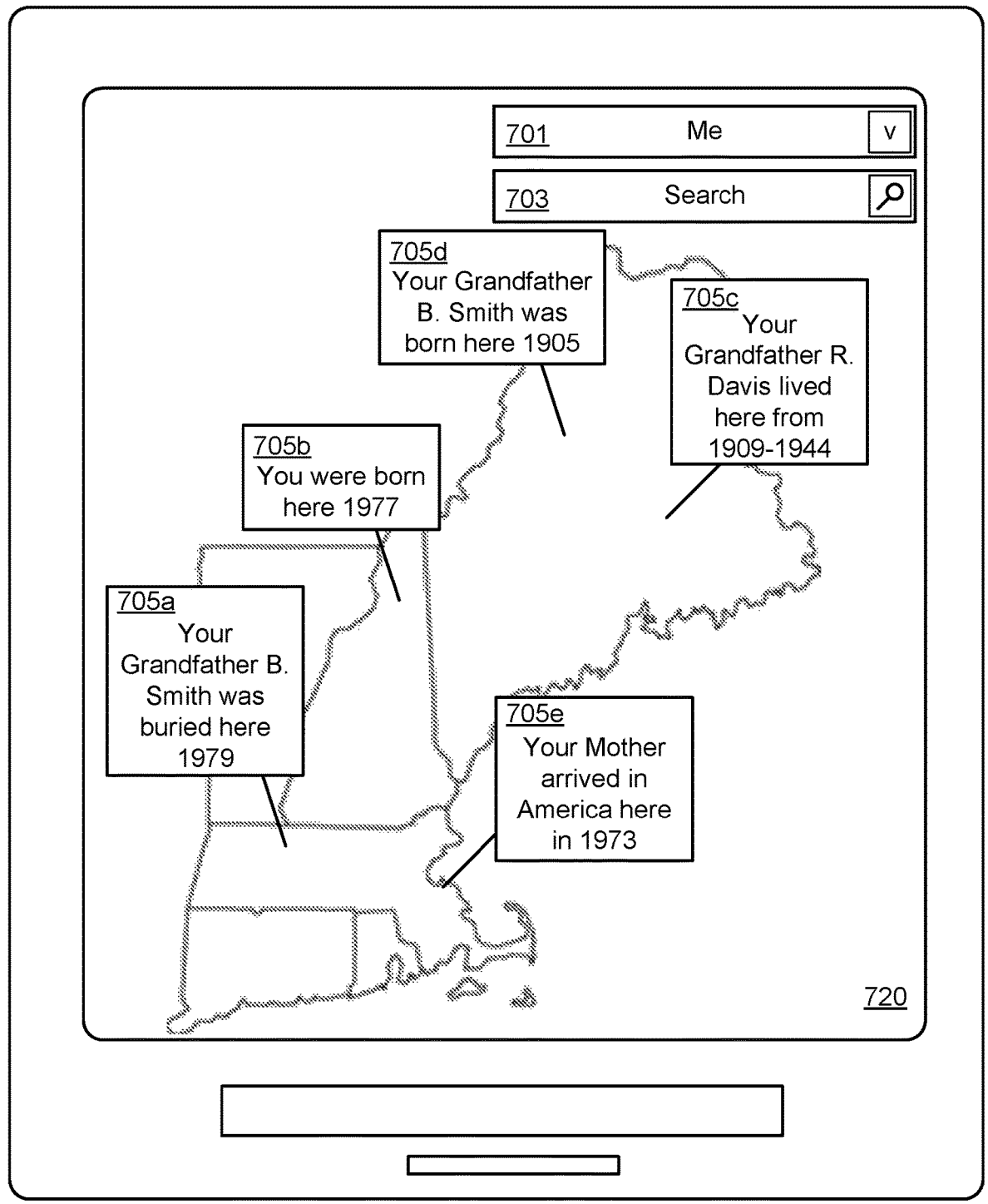
FIG. 7 is an illustration of an example user interface for viewing a map and interacting with one or more locations from historical data.

FIG. 7 is an illustration of an example user interface 700 for viewing a map 140 and interacting with one or more locations 117 from historical data 273. The user interface 700 may be implemented by a map client 113 executing on a client device 110. As shown, the user interface 700 is displayed on a tablet computing device. However, the user interface 700 may be displayed by other computing devices such as smart phones and vehicle navigation systems.

As shown in a window 720, a user is viewing a map 140. The user interface 700 includes user interface elements 701 and 703. The user interface element 701 may be used to select a contact 171 whose historical data 273 that the user would like to view on the map 703. The user interface 703 labeled "Search" may be used to provide a query 115 for the selection engine 215 to search against the historical data 273 associated with the contact 171 selected using the user interface element 701.

In the example shown, the user has selected the contact 171 labeled "Me" indicating that the user would like to view locations 117 from the historical data 273 associated with themselves. Accordingly, the selection engine 215 has retrieved the historical data 273 associated with the user, and has provided locations 117 from the historical data 273 as part of the results 169.

The map client 113 has rendered and displayed the locations 117 from the results 169 in the window 720. In the example shown, several locations 117 have been rendered on the map 140 as the icons 705 (e.g., the icons 705a, 705b, 705c, 705d, and 705e). Each icon 705 is rendered along with descriptive information about the associated location 117. The rendered icons 705 correspond to locations 117 that are important to the user, or the ancestors of the user. For example, the icon 705b corresponds to a location 117 where the user was born, and the icon 705c corresponds to a location 117 where a grandfather of the user lived.

Figure 8:
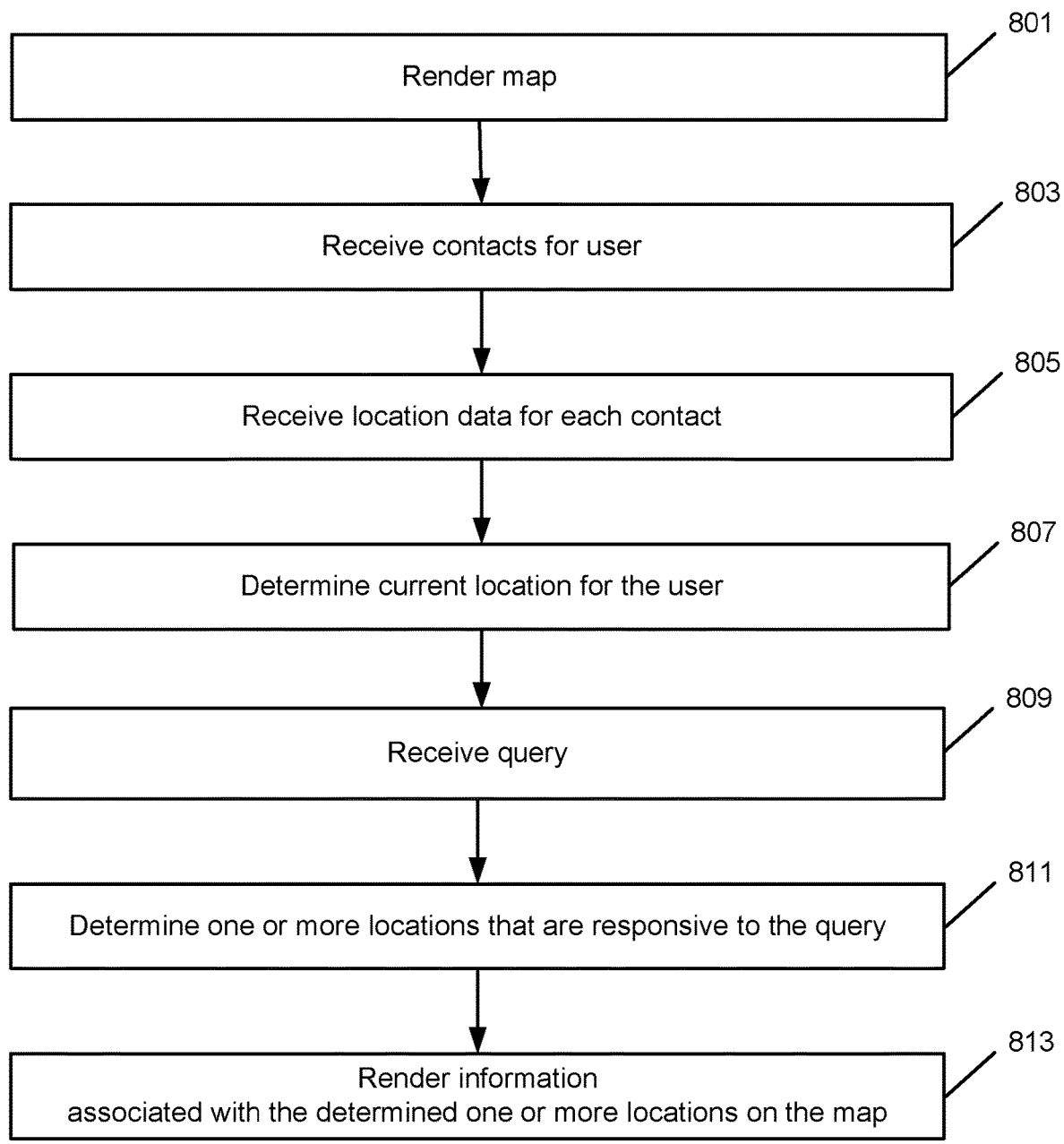
FIG. 8 is an operational flow of an implementation of a method for determining one or more locations that are responsive to a query using location data, and for rendering information associated with the determined one or more locations on a map.

FIG. 8 is an operational flow of an implementation of a method 800 for determining one or more locations that are responsive to a query using location data and for rendering information associated with the determined one or more locations on a map. The method 800 may be implemented by the map engine 165 and/or the map client 113.

At 801, a map is rendered. The map 140 may be rendered by a map client 113 on a display of a client device 110 associated with a user.

At 803, contacts associated with the user are received. The contacts 171 may be received from the contact engine 205 by the selection engine 215. The contacts 171 may be associated with one or more applications such as social networking applications, for example.

At 805, location data for each contact is received. The location data 172 may be received from the location engine 210 by the selection engine 215. The location data 172 for each contact 171 may include a plurality of locations 117, and each location 117 may be associated with a time when the contact 171 was at the location 117. Alternatively, the location data 172 may include a plurality of locations 171 where the user and the contact 171 were at each location 171 together at a same time.

In some implementations, the location data 172 for a contact 171 may also include historical data 273 for the contact 171. The historical data 273 may include information about one or more ancestors of the contact 171, such as locations 117 where each ancestor was born, died, lived, and was buried. Other information about the ancestors of a contact 171 may be included.

At 807, a current location is determined for the user. The current location 117 of the user may be determined by a location engine 210 using a location determination component (e.g., GPS) associated with the client device 110 of the user. The current location 117 may be rendered on the map 140 by the map client 113.

At 809, a query is received. The query 115 may be received by the selection engine 215. The query 115 may specify one or all of a contact 171, a keyword, a time, or a type. The types of locations 117 may include businesses, landmarks, restaurants, coffee shops, residences, etc.

At 811, one or more locations that are responsive to the query are determined. The one or more locations 117 may be determined by the selection engine 215. The one or more locations 117 may be locations 117 from the location data 172 associated with each of the contacts 117. A location 117 may be responsive to the query 115 if it matches, or is a partial match, of one or more of the contact 171, keyword, time, or type associated with the query 115. In some implementations, the selection engine 215 may only consider locations that are less than a threshold distance from the current location 117 of the user. The threshold distance may be based on the scale used to render the map 140, and may include locations 117 that are visible on the rendered map 140.

At 813, information associated with the determined one or more locations is rendered on the map. The information may be rendered by the map client 113 on the display associated with the client device 110. The information rendered for each location 117 may include an icon representing the location 117, the contact(s) 171 associated with the location 117, and the time(s) associated with the location 117. Other information may be included.

Figure 9:
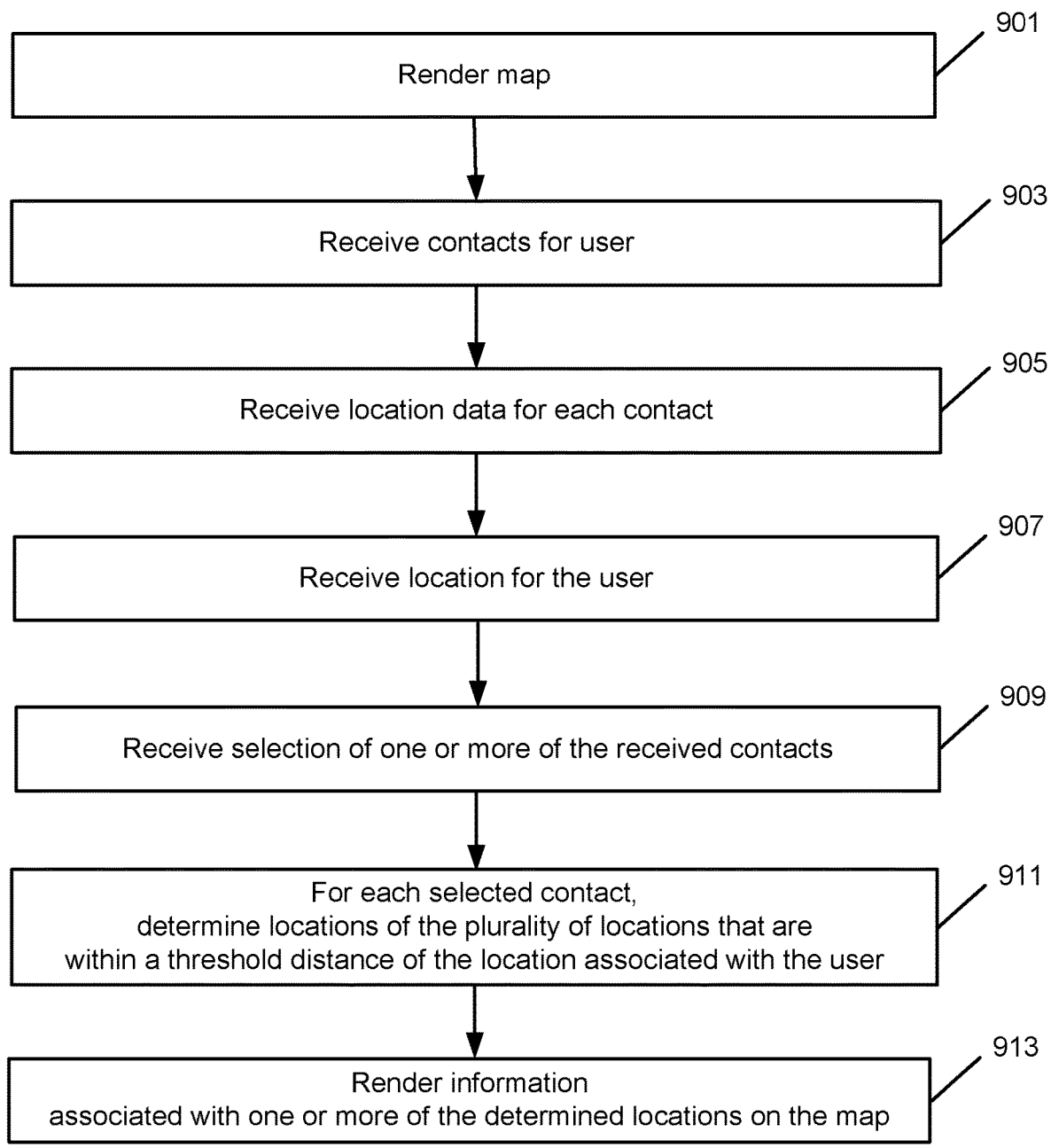
FIG. 9 is an operational flow of an implementation of a method for determining locations that are relevant to a user based on location data associated with contacts of the user.

FIG. 9 is an operational flow of an implementation of a method 900 for determining locations that are relevant to a user based on location data associated with contacts of the user. The method 900 may be implemented by the map engine 165 and/or the map client 113.

At 901, a map is rendered. The map 140 may be rendered by a map client 113 on a display of a client device associated with a user. The map 140 may have a scale or zoom level that controls how many locations 117 are visible on the map 140.

At 903, contacts associated with the user are received. The contacts 171 may be received from the contact engine 205 by the selection engine 215. The contacts 171 may be associated with one or more applications such as social networking applications, for example.

At 905, location data for each contact is received. The location data 172 may be received from the location engine 210 by the selection engine 215. The location data 172 for each contact 171 may include a plurality of locations 117, and each location 117 may be associated with a time when the contact 171 was at the location 117. The location data 172 for contact 171 may further include historical data 173 such as location 117 associated with ancestors of the contact 171.

At 907, a location is received for the user. The location 117 may be the current location 117 of the user, or may be a location 117 (e.g., address) that was entered or provided by the user into the map client 113. The location 117 may be received by the location engine 210 from the map client 113. The received location 117 may be rendered on the map 140 by the map client 113.

At 909, a selection of one or more of the received contacts is received. The selection of the one or more contacts 171 may be received by the map client 113 from a user. For example, a user may select a contact 171 using a user interface element rendered and displayed by the map client 113.

At 911, for each selected contact, locations of the plurality of locations of the location data associated with the selected contact are determined. The locations 117 determined for each contact 171 may be determined by the selection engine 215.

Depending on the implementation, the determined locations 117 may be locations that are within a threshold distance of the received location of the user. The threshold distance may be based on the scale or zoom level of the map and may be selected such that all of the determined locations 117 can be viewed on the map 140 at the current scale or zoom level. In addition, the times associated with each location 117 may be considered such that only locations 117 associated with recent times are considered. Other factors may be used to filter or restrict locations 117.

At 913, information associated with the determined one or more locations is rendered on the map. The information may be rendered by the map client 113 on the display associated with the client device 110. The information rendered for each location 117 may include an icon representing the location 117, the contact(s) 171 associated with the location 117, and the time(s) associated with the location 117. Other information may be included.

FIG. 10 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for using historical location data for contacts associated with a user to determine locations that are responsive to user queries is provided. The system includes at least one computing device and a map engine. The map engine may be adapted to: receive contacts for a user from one or more applications; receive location data for each of the contacts, wherein the location data for each contact comprises a plurality of locations, and each location of the plurality of locations is associated with a time when the contact was at the associated location; receive a query from the user; and determine one or more locations that are responsive to the query based on the received contacts and the received location data for each of the received contacts.

Implementations may include some or all of the following features. The query may identify a contact of the received contacts and may request one or more locations where the user and the identified contact were at the same location at a same time. The map engine may be further adapted to determine a current location of the user. The query may identify a type of location and may request one or more locations of the same type within a threshold distance of the current location of the user that are part of the location data for a contact of the received contacts. The types of locations may include businesses, landmarks, restaurants, parks, bars, coffee shops, and residences. The threshold distance may be based on a map rendered by the map engine. The location data for a contact may further include location data for one or more ancestors of the contact. The one or more applications may include social networking applications. The map engine may be further adapted to render information associated with the determined one or more locations on a map.

In an implementation, a system for using historical location data for contacts associated with a user to determine locations that are relevant to a location associated with the user is provided. The system may include at least one computing device and a map engine. The map engine may be adapted to: render a map; receive contacts for a user from one or more applications; receive location data for each of the contacts, wherein the location data for each contact comprises a plurality of locations, and each location of the plurality of locations is associated with a time when the contact was at the associated location; receive a location associated with the user; receive a selection of a contact of the received contacts; based on the received location, determine locations of the plurality of locations of the selected contact that are within a threshold distance of the location associated with the user; and render information associated with one or more of the determined locations on the map.

Implementations may include some or all of the following features. The time when the contact was at the associated location may be a time when the contact was at the associated location with the user. The threshold distance may be based on a scale of the rendered map. The location data for a contact further may include location data for ancestors of the contact. The map engine may be further adapted to: receive a query from the user; and determine one or more locations that are responsive to the query based on the received contacts and the received location data for each of the received contacts. The map engine may be further adapted to render information associated with the determined one or more locations that are responsive to the query on the map.

In an implementation, a method for using historical location data for contacts associated with a user to determine locations that are responsive to user queries is provided. The method includes: rendering a map on a display by a computing device; receiving contacts for a user by the computing device; receiving location data for each of the contacts by the computing device, wherein the location data for each contact comprises a plurality of locations, and each location of the plurality of locations is associated with a time when the contact was at the associated location with the user; receiving a query from the user by the computing device; determining one or more locations that are responsive to the query based on the received contacts and the received location data for each of the received contacts by the computing device; and rendering information associated with the determined one or more locations on the map by the computing device.

Implementations may include some or all of the following features. The query may identify a type of location and may request one or more locations of the same type within a threshold distance of a current location of the user that are part of the location data for a contact of the received contacts. The types of locations may include businesses, landmarks, restaurants, parks, bars, coffee shops, and residences. The threshold distance may be based on a scale of the rendered map. The contacts may be received from one or more social networking applications. The location data for a contact further may further include location data for ancestors of the contact.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for using historical location data for contacts associated with a user to determine locations that are responsive to user queries, the system comprising:
a display; and
a map engine configured to:
receive contacts for a user from one or more applications;
receive and store location data for each of the contacts, wherein the location data for each contact comprises a plurality of locations, and wherein the location data includes, for each location of the plurality of locations, a time when the contact was previously at the location;
receive a query regarding the received contacts from the user;
determine one or more locations that are responsive to the query based on the received contacts and the received location data for each of the received contacts, wherein the map engine is further adapted to determine a current location of the user, the query identifying a type of location and requesting one or more locations of the same type within a threshold distance of the current location of the user that are part of the location data for a contact of the received contact; and
render, on the display, information about the one or more determined locations on a map.

2. The system of claim 1, wherein the query identifies a contact of the received contacts and requests one or more locations where the user and the identified contact were at the same location at a same time.

3. The system of claim 1, wherein the query includes at least one date, and wherein the one or more locations determined by the map engine are associated with the at least one date.

4. The system of claim 1, wherein the threshold distance is based on the map rendered by the map engine.

5. The system of claim 1, wherein the location data for a contact further comprises location data for one or more ancestors of the contact.

6. The system of claim 1, wherein the one or more applications comprise social networking applications.

7. A system for using historical location data for contacts associated with a user to determine locations that are relevant to a location associated with the user, the system comprising:
a display;
a map engine configured to:
render a map;
receive contacts for a user from one or more applications;
receive and store location data for each of the contacts, wherein the location data for each contact comprises a plurality of locations, and wherein the location data includes, for each location of the plurality of locations, a time when the contact was previously at the location;
receive a location associated with the user;
receive a selection of a contact of the received contacts;
based on the received location, determine locations of the plurality of locations of the selected contact that are within a threshold distance of the location associated with the user; and
render, on the display, information associated with one or more of the determined locations on the map.

8. The system of claim 7, wherein the time when the contact was at the associated location further comprises the time when the contact was at the associated location with the user.

9. The system of claim 7, wherein the threshold distance is based on a scale of the rendered map.

10. The system of claim 7, wherein the location data for a contact further comprises location data for ancestors of the contact.

11. The system of claim 7, wherein the map engine is further configured to:
receive a query from the user; and
determine one or more locations that are responsive to the query based on the received contacts and the received location data for each of the received contacts.

12. The system of claim 11, wherein the map engine is further configured to render information associated with the determined one or more locations that are responsive to the query on the map.

13. A method for using historical location data for contacts associated with a user to determine locations that are responsive to user queries, the method comprising:
rendering a map on a display by a computing device;
receiving contacts for a user by the computing device;
receiving and storing location data for each of the contacts by the computing device, wherein the location data for each contact comprises a plurality of locations, and wherein the location data includes, for each location of the plurality of locations, a time when the contact was previously at the location with the user;
receiving a query regarding the received contacts from the user by the computing device;
determining one or more locations that are responsive to the query based on the received contacts and the received location data for each of the received contacts by the computing device; and
rendering information associated with the determined one or more locations on the map by the computing device.

14. The method of claim 13, wherein the query identifies a type of location and requests one or more locations of the same type within a threshold distance of a current location of the user that are part of the location data for a contact of the received contacts.

15. The method of claim 13, wherein the query includes at least one date, and wherein the one or more determined locations are associated with the at least one date.

16. The method of claim 14, wherein the threshold distance is based on a scale of the rendered map.

17. The method of claim 13, wherein the contacts are received from one or more social networking applications.

18. The method of claim 13, wherein the location data for a contact further comprises location data for ancestors of the contact.

* * * * *